(12) United States Patent
Niblock

(10) Patent No.: US 8,397,579 B2
(45) Date of Patent: Mar. 19, 2013

(54) COMPACT PRESSURE-SENSING DEVICE

(75) Inventor: Trevor Graham Edward Niblock, Sunnyvale, CA (US)

(73) Assignee: Analatom Incorporated, Sunnyvale, CA (US)

( * ) Notice: Subject to any disclaimer, the term of this patent is extended or adjusted under 35 U.S.C. 154(b) by 0 days.

(21) Appl. No.: 12/477,829

(22) Filed: Jun. 3, 2009

(65) Prior Publication Data
US 2011/0001396 A1 Jan. 6, 2011

Related U.S. Application Data

(63) Continuation of application No. 11/401,692, filed on Apr. 10, 2006, now Pat. No. 7,543,502.

(60) Provisional application No. 60/669,746, filed on Apr. 8, 2005.

(51) Int. Cl.
*G01L 9/06* (2006.01)

(52) U.S. Cl. .................. 73/727; 73/700; 73/702; 73/716

(58) Field of Classification Search .................. None
See application file for complete search history.

(56) References Cited

U.S. PATENT DOCUMENTS

| | | | | |
|---|---|---|---|---|
| 4,141,253 A * | 2/1979 | Whitehead, Jr. | ................. | 73/727 |
| 4,975,390 A | 12/1990 | Fujii et al. | | |
| 4,993,143 A | 2/1991 | Sidner et al. | | |
| 5,357,807 A * | 10/1994 | Guckel et al. | ................... | 73/721 |
| 5,410,916 A * | 5/1995 | Cook | ................................ | 73/706 |
| 5,442,962 A | 8/1995 | Lee | | |
| 5,520,054 A * | 5/1996 | Romo | ............................. | 73/715 |
| 5,663,508 A | 9/1997 | Sparks | | |
| 5,744,726 A * | 4/1998 | Maurer | ........................... | 73/727 |
| 5,756,899 A | 5/1998 | Ugai et al. | | |
| 5,883,420 A | 3/1999 | Mirza et al. | | |
| 5,946,642 A * | 8/1999 | Hedrick | ........................ | 702/138 |
| 6,006,607 A * | 12/1999 | Bryzek et al. | ..................... | 73/727 |
| 6,229,190 B1 * | 5/2001 | Bryzek et al. | .................. | 257/419 |
| 6,388,279 B1 | 5/2002 | Sakai et al. | | |
| 6,631,648 B2 * | 10/2003 | Lal et al. | ..................... | 73/861.71 |
| 7,197,939 B2 | 4/2007 | Sakai et al. | | |
| 7,389,696 B1 | 6/2008 | Werner | | |
| 7,543,502 B2 * | 6/2009 | Niblock | ........................... | 73/727 |
| 7,644,625 B2 * | 1/2010 | Ricks | ............................... | 73/756 |

OTHER PUBLICATIONS

PCT International Search Report dated Jun. 11, 2008, corresponding to the related PCT US06/13332.

* cited by examiner

*Primary Examiner* — Lisa Caputo
*Assistant Examiner* — Jermaine Jenkins
(74) *Attorney, Agent, or Firm* — DLA Piper LLP (US)

(57) ABSTRACT

The innovations herein include a compact sensing device that is capable of measuring the conditions (e,g, pressure, temperature) inside a cylinder of an internal combustion engine. Aspects also include a cost-effective method of fabricating the sensing device. An exemplary sensing device includes a substrate, a beam, and piezo-resistive sensing elements. The beam, which is formed on the substrate, is capable of deflecting according to different pressures applied to different beam surfaces. The piezo-resistive sensing elements are coupled to the beam and detect beam deflection. The piezo-resistive sensing elements generate an electrical signal corresponding to the beam deflection.

17 Claims, 16 Drawing Sheets

COMPACT PRESSURE-SENSING DEVICE

CROSS REFERENCE TO RELATED APPLICATION(S)

This is a continuation of application Ser. No. 11/401,692, filed Apr. 10, 2006, published as 2007/0016384-A1, now U.S. Pat. No. 7,543,502, which claims benefit/priority under 35 U.S.C. §119(e) of provisional application No. 60/669,746, filed on Apr. 8, 2005, all of which are incorporated herein by reference in entirety.

BACKGROUND

1. Field

The invention relates generally to a sensor and more specifically to a miniature sensor with good heat tolerance.

2. Description of Related Information

Internal combustion engines are relied upon today for numerous applications, primarily transportation. For the engines to perform reliably at the desired performance level and last its potential lifespan, they need periodic maintenance. Engine monitoring systems are used to determine when a maintenance service is due for an engine. Today, most engine monitoring systems make this determination by monitoring the exhaust output and the time interval since its last maintenance/service.

Although these engine monitoring systems detect service needs well enough in many situations, there is room for improvement. One disadvantage of the current engine monitoring system is that the vehicles using the engine usually incorporate an adaptive control which can compensate for wear of the pistons, cylinders, and valves to a certain degree. Due to the function of the adaptive control, it possible for unacceptable wear and catastrophic failure of the engine to occur "suddenly" without sufficient warning.

This undesirable "sudden" failure can be avoided by monitoring the combustion processes inside the cylinder where pressure loss could be detected to provide accurate, undisguised status of the engine. However, although it is known that in-cylinder pressure and temperature sensor systems are highly desirable, they are too costly to implement. The challenges in implementing in-cylinder sensor systems stem from the expected life span of the sensors and the initial cost and the necessity to bore, tap, and die a fixing into the cylinder head for the sensor. The cost and complexity of fitting a pressure sensor into the cylinder head is inhibitive despite its advantages. Thus, attempts to measure the environmental factors (e.g., temperature and pressure) in the cylinder involve placing sensor arrays outside the combustion cylinder.

Generally, there are two types of sensors: sealed cavity and optical. The sealed cavity-type uses MEMS technology to micro machine out the cavity and use either capacitive or piezo-resistive techniques to measure the deflection of a diaphragm over the cavity as the ambient pressure changes in relation to that in the cavity. The optical-type sensors use either a cavity technique to bounce light off of the diaphragm or interferometry to gauge the strain in a fiber optic cable. Both types of sensors require access to the sensor by boring through the cylinder head and are of relatively high unit cost. Due to the high cost, these sensors have thus been limited to laboratory-scale applications.

Thus, a need exists for a cost-effective means of accurately monitoring environmental factors in a combustion cylinder.

SUMMARY

The invention is a sensing device that is capable of measuring the conditions (e.g., pressure, temperature) inside a cylinder of an internal combustion engine. The invention is also a cost-effective method of fabricating the sensing device.

In one aspect, the invention is a sensing device that includes a substrate, a beam, and piezo-resistive sensing elements. The beam, which is formed on the substrate, is capable of deflecting according to different pressures applied to different beam surfaces. The piezo-resistive sensing elements are coupled to the beam and detect beam deflection. The piezo-resistive sensing elements generate an electrical signal corresponding to the beam deflection.

In another aspect, the invention is a sensor that includes a flexible material and a sensing device mounted on the flexible material. The flexible material has an electrical interface. The sensing device includes a substrate, a cavity formed in the substrate, a beamed formed on the substrate, piezo-resistive sensing elements coupled to the beam, and bond pads electrically coupled to the piezo-resistive sensing elements. The beam is capable of deflecting according to difference between pressure inside the cavity and pressure outside the cavity. The piezo-resistive sensing elements detect beam deflection and generate an electrical signal corresponding to the beam deflection. The bond pads are electrically coupled to the electrical interface on the flexible material.

In another aspect, the invention is a method of fabricating a sensing device. The method entails providing a substrate, forming a beam on the substrate, and doping a portion of the substrate to form piezo-resistive sensing elements coupled to the beam. The piezo-resistive sensing elements detect beam deflection and generate an electrical signal corresponding to the beam deflection.

DETAILED DESCRIPTION OF EXEMPLARY IMPLEMENTATIONS

The present invention is a combined MEMS pressure and temperature sensor for measuring the realtime combustion conditions of each cylinder in an internal combustion engine. In one embodiment, the device can be fabricated as a roughly planar micro-machined sensor of 20 μm (0.0008") thickness using piezo resistors to measure both the strain and temperature. The device can use a cavity flow method of pressure measurement.

The invention solves technical and economic problems with sensors that are currently available. An advantage of the invention is that the device is roughly planar and less than approximately 100 μm thick including packaging, therefore able to fit as part of the cylinder head gasket without requiring machining or redesigning of the cylinder head. The device is therefore able to be fitted to units currently in service as well as new units. The thinness of the device will also allow it to be easily transferred over to other applications where a gasket is used to mate components such as gas turbines. Additionally, the device of the invention may be made with a MEMS construction technique that allows for cost-effective mass production with good homogeneity. The use of MEMS technology, and in particular silicon and silicon carbide, allows the fabrication of a device that offers high performance and low dimensions.

The device brings significant improvement in engine monitoring, as it measures the actual conditions in the cylinder. Additionally, combustion pressure and temperature data can be used to improve performance reducing the need for many other sensors that are currently used on the periphery of the engine.

Device Geometry

Figure 1:
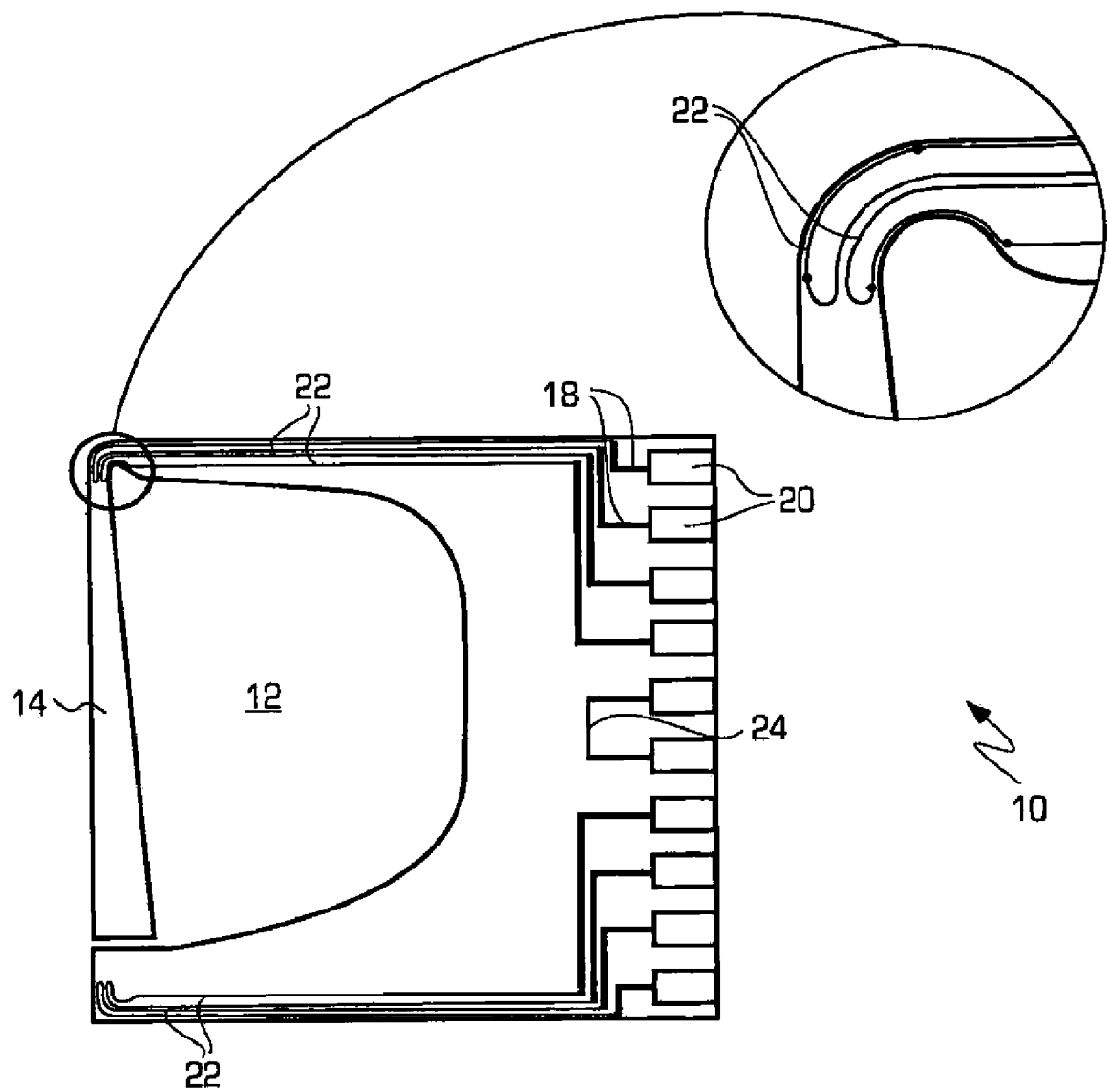
FIG. 1 shows a schematic of a sensor device in accordance with an embodiment of the invention.
Figure 2A:
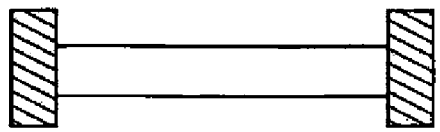
FIG. 2A is a diagram of a beam with uniform cross-section and both ends fixed.
Figure 2B:
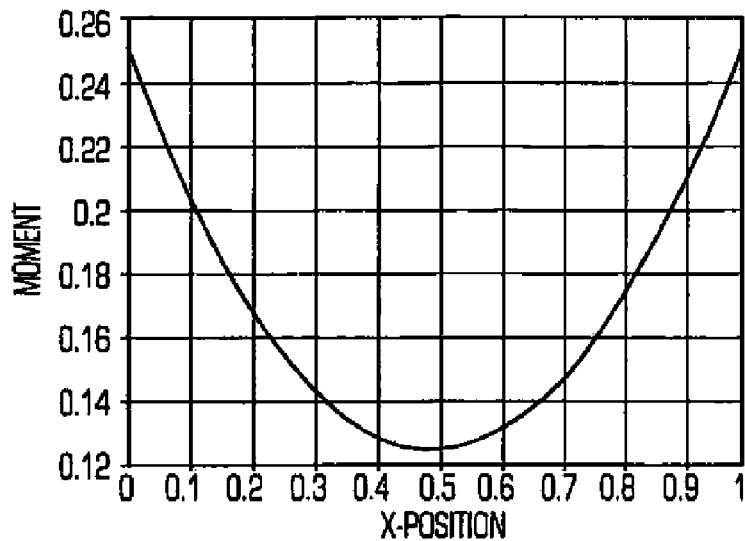
FIGS. 2B and 2C are plots showing the moment and the displacement, respectively, of the beam of FIG. 2A along the length of the beam.
Figure 2C:
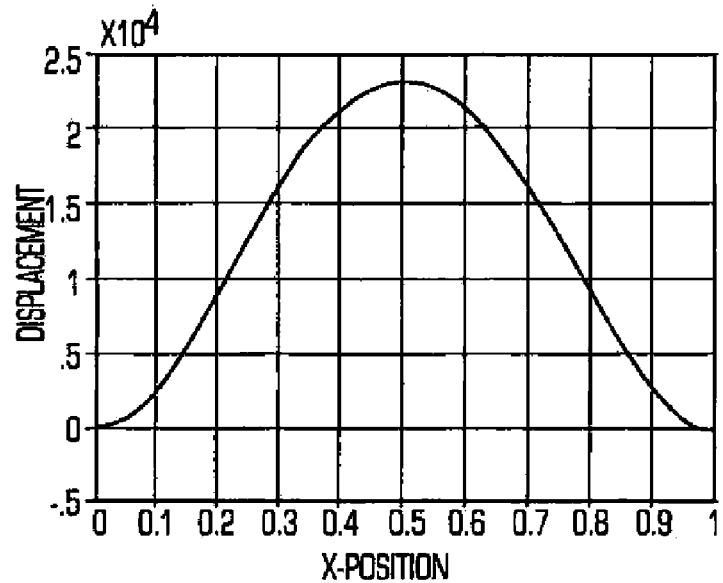
Figure 3A:
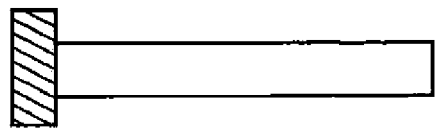
FIG. 3A is a diagram of a beam with uniform cross-section having one fixed end and one free end.
Figure 3B:
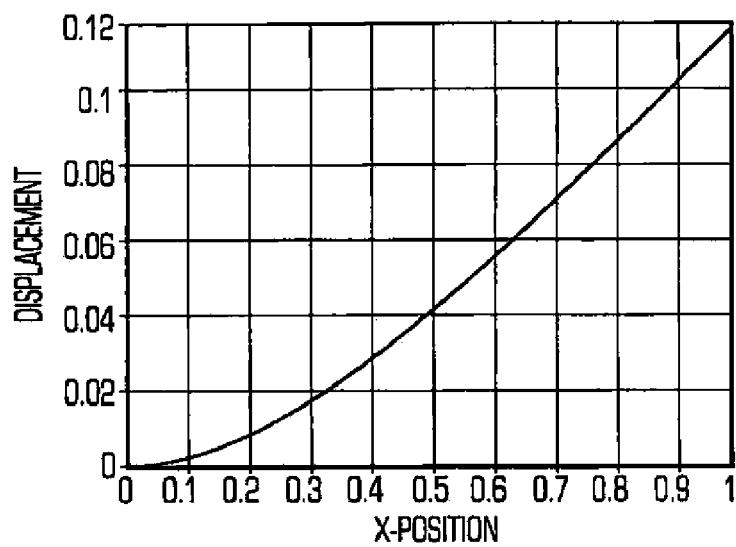
FIGS. 3B and 3C are plots showing the moment and the displacement, respectively, of the beam of FIG. 3A along the length of the beam.
Figure 3C:
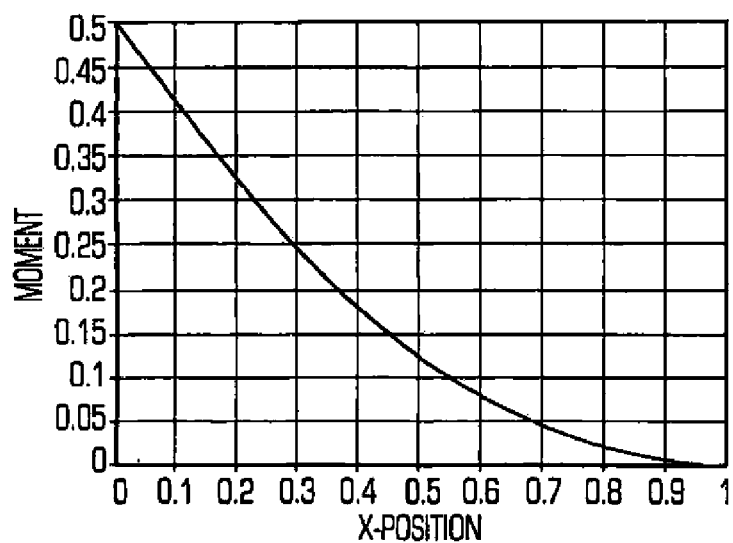
Figure 4A:
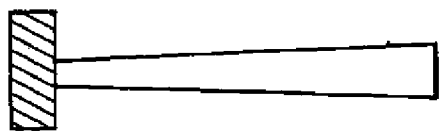
FIG. 4A is a diagram of a beam with decreasing cross-section having one fixed end and one free end.
Figure 4B:
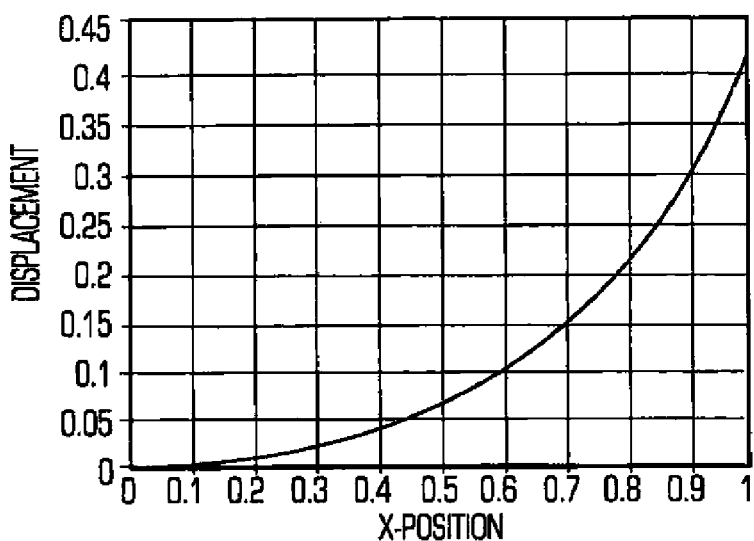
FIGS. 4B and 4C are plots showing the moment and the displacement, respectively, of the beam of FIG. 4A along the length of the beam.
Figure 4C:
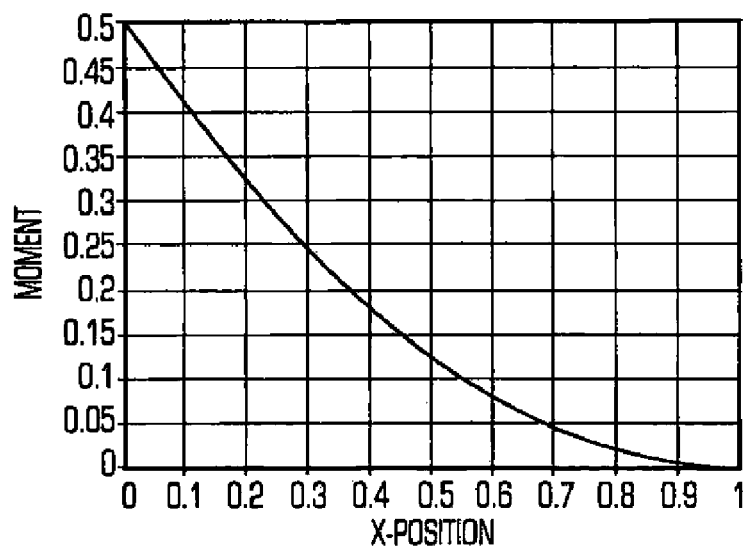
Figure 5A:
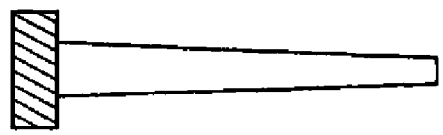
FIG. 5A is a diagram of a beam with increasing cross-section having one fixed end and one free end.
Figure 5B:
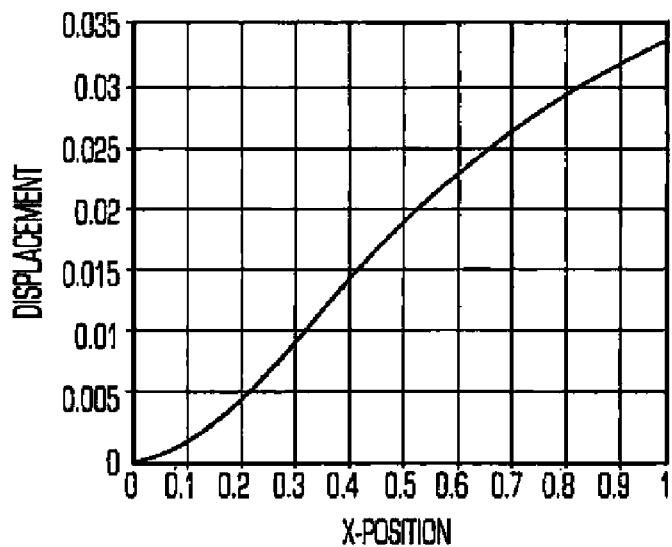
FIGS. 5B and 5C are plots showing the moment and the displacement, respectively, of the beam of FIG. 5A along the length of the beam.
Figure 5C:
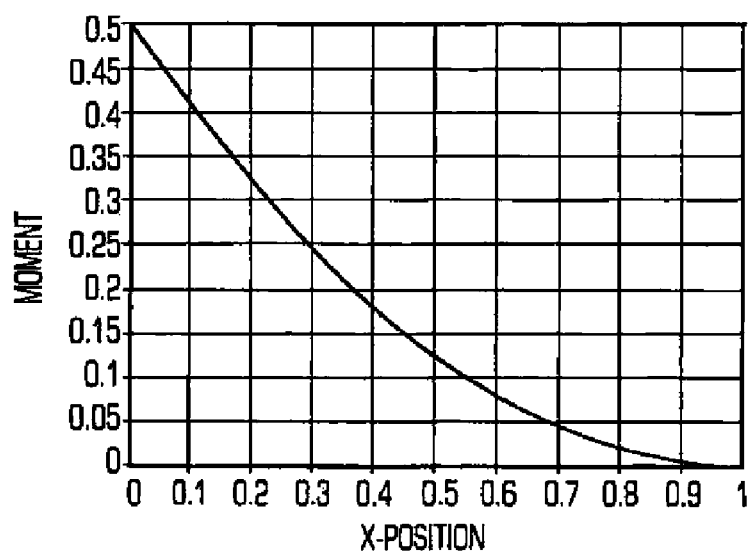

FIG. 1 shows a sensing device 10 in accordance with the invention. The sensing device 10 is compact, being no larger than about 10 cm×10 cm×100 μm in size and sometimes as small as 10 cm×10 cm×20 μm. The sensing device 10 has a cavity 12 that acts as a pressure chamber and a beam 14 that moves in the plane of the sensing device 10. As the pressure in the space around the sensing device 10 increases, gas flows into the cavity 12 through a gas flow passage 16, causing the beam 14 to deflect into the cavity 12. After a certain period of gas flow (after a cylinder cycle), the pressure outside the sensing device 10 decreases as the post-combustion gases exit the cylinder. At this point, the beam 14 returns to neutral position. To ensure free movement of the beam 14, its dimensions in the plane of the device (i.e., the thickness) are reduced on the side that it contacts the gasket. Computational analysis can be employed to calculate the deflection of the metal (inner cylinder) seal over the device.

The beam 14 is coupled to aluminum tracks 18 that lead to bond pads 20. At the interface between the aluminum tracks 18 and the beam 14 are piezo-resistive sensing elements 22. These sensing elements 22 are formed by being doped into a silicon substrate. The beam 14 is structured to induce maximum strain at its base where the piezo-resistive sensing elements 22 are doped into the silicon. The piezo-resistive sensing elements 22 detect the position of the beam 14, which changes to reflect the pressure in the surroundings as described above.

At the same crystal orientation, two sets of resistors can be placed in the bulk (un-strained) silicon to form additional piezo-resistive sensing elements 22 for temperature detection. With two sets of pressure-measuring sensing elements and two sets of temperature sensing elements, an electronic bridge can be set up to read the effect of strain on the device. The sensing device 10 may be designed with four resistors not wired together. The resistors may be wired to form a two-resistor bridge or a four-resistor bridge. In the case of the two-resistor bridge, the remaining two resistors are used for temperature compensation. In the four resistor bridge, no temperature compensation is done because the resistors are so close to one another to need temperature compensation.

In some embodiments, a single piezo resistor is placed at the base of the sensing device 10, in addition to the pair of pressure sensing elements 22, for temperature measurement. In other embodiments, a p-n diode may be used instead of the single piezo resistor. In these embodiments, the combination of photons and phonons from the combustion process may provide the diode with a "finger print" identification of a good or bad combustion process.

The sensing device 10 may be placed approximately 10 mm off the cylinder where temperatures are lower due to engine cooling. The sensing device 10 is implemented by being mounted on a flex material, as will be described below, and the cooler temperature 10 mm away from the cylinder facilitates the design of the flex material. The flex material has to be able to tolerate the expected maximum temperature in the area where the sensing device 10 is placed. For the sensing device 10 to operate effectively, the sensor (i.e., the sensing device 10 mounted on a flex material) is mated to the cylinder head gasket, allowing free movement of the beam 14. A secure mating is achieved by micro-machining techniques but the plastic flow of the seal ring on the head gasket may pose an issue. Thus, gasket designs to accommodate micro-sensors may be implemented, concentrating on even distribution of clamping forces around the sensor. Preferably, the clamping force is sufficient to seal the cylinder during firing but loose enough to allow free beam movement.

Device Design

The sensing device 10 may be fabricated by using a MEMS process. In the fabrication process, flow rates of gas through the gas flow passage 16 is calculated. The calculation result is then used to evaluate the pressure difference between the space in the cylinder and the cavity 12. The geometries of the beam 14 and the plastic hinge where the piezo-resistive sensors 22 are mounted are determined based on computation analysis using the pressure difference. The anticipated strain during firing can then be determined and the results are used to set up the electronics and signal analysis.

Specifically, a mathematical model is used to determine the geometry of the beam 14 and the plastic hinge. The mathematical model uses fluid dynamics to calculate the flow rate through an orifice (gas flow passage 16) into the cavity 12. The flow rate is in turn used to determine the pressure difference between the cylinder and the cavity 12. In some embodiments, the beam 14 is designed to have a lower section modulus at its base, thus maximizing the stresses at the base. The well-known bending theory is used to calculate this stress and ensure that it does not exceed the Ultimate Tensile Strength (UTS) of the silicon. The goal is to maximize the strain at the base of the beam 14 where the two piezo resistive sensing elements 22 are placed. The piezo resistive sensing elements 22 are used to calculate the pressure in the cylinder.

When designing the sensing device 10, cavity resonations and the basic response time of the cavity orifice (gas flow passage 16) are taken into account.

The parameter for cavity resonator comes into play when a small space (such as the cavity 12) is connected to a larger space (such as the cylinder) by connecting lines that have a volume less than the cavity. The smaller space can support acoustic oscillations between it and the larger space. The dynamic equations for the gas flow in the connecting lines can be expressed as follows:

$$(p - p_a)A_o = \rho A_o L_o \frac{du}{dt} \text{ Orifice Momentum}$$

$$V \frac{\partial \rho}{\partial t} = -\rho A_o u \text{ Cavity Mass Balance}$$

where p=pressure in the small chamber and $p_a$=pressure in the larger chamber.

Combining the above two equations and introducing sound speed results in $$\frac{d^2 P}{dt^2} + \frac{a^2 A_o}{L_o V} P = 0 \text{ where } P = p - p_a$$

$A$ = sound speed $A_o$ = orifice area $L_o$ = orificelength $V$ = cavity volume Therefore, P can support harmonic oscillations ω:

$$\omega = \sqrt{\frac{a^2 A_o}{L_o V}}$$

In an exemplary sensing device 10 with the following dimensions:

$d = 1 \times 10^{-4}$ Cavity depth; $h = 5 \times 10^{-3}$ Cavity height;

$w = 1 \times 10^{-3}$ Cavity width;

$d_o = 1 \times 10^{-4}$ Orifice depth; $h_o = 0.5 \times 10^{-3}$ Orifice height;

$L_o = 0.5 \times 10^{-3}$ Orifice length; $a = 500 \frac{m}{s}; \rho = 10 \frac{m}{s}$ the time for a cavity resonance is $$\omega = \frac{1}{\tau} = \sqrt{5} \times 10^5$$

Another characteristic of an orifice in unsteady flow is the response time for the orifice to adjust to a step input of flow. If the orifice is represented by a fluid circuit, the basic dynamic equation is:

$$\frac{\rho L_o}{A_o} \frac{dQ}{dt} + \frac{\rho f L_o \bar{u}}{2 A_o h_o} Q = 0 = l \frac{dQ}{dt} RQ$$

where $Q$ = Volume flow rate;

$f$ = friction factor the solution for which is the following:

$$\frac{Q}{Q_i} = e^{-\frac{t}{\tau}} \text{ where } \tau = \frac{l}{R} \text{ and } Q_i = \text{Input Flow}$$

Thus, using an exemplary average velocity of 10 m/s, friction factor of 0.05, and the geometrical numerical values listed previously, we obtain the value of T as $$\tau = \frac{l}{R} \approx \frac{10^5}{2 \times 10^7} = 5 \times 10^{-3} s$$

So, for an exemplary engine rotating at 1800 rpm, the time for one cycle is 0.0333 seconds and the response time of the orifice is similar to the time for the combustion of gases in the cylinder.

To predict the deflection of the beam 14 and moments and stresses in the sensing device 10, the following equations on strength of materials may be used:

$y$ = deflection $$\frac{dy}{dx} = \theta \text{ slope}$$

$$\frac{d}{dx}\left(EI\frac{dy}{dx}\right) = M \text{ Moment}$$

$$\frac{d}{dx}\left(EI\frac{d^2 y}{dx^2}\right) = V \text{ Shear}$$

$$\frac{d^2}{dx^2}\left(EI\frac{d^2 y}{dx^2}\right) = p \text{ Loading}$$

For increased flexibility in the design of a pressure sensor, it is useful to consider materials that are capable of having variable elasticity (E) and moment of inertia (I). When the equations above on strength of materials are reformulated as coupled second order equations for ease of solution and application of boundary conditions, the results are as follows:

$$\frac{d}{dx}\left(EI\frac{dy}{dx}\right) = M$$

$$\frac{d^2 M}{dx^2} = p$$

The solution embodied in the above equation may be implemented in a computer code including tridiagonal matrix method, which is marched to convergence by a time marching technique. FIGS. 2A-5C show the solution of these equations for four different beam configurations: 1) a beam with uniform cross-section and both ends with zero slope, 2) a beam with uniform cross-section and one end free, 3) a beam with decreasing cross-section and one end free, and 4) a beam with increasing cross-section and one end free. The cross-sections are varied by a factor of two in the beam height, and this causes the moment of inertia (I) to vary by a factor of eight. All scales in the figures are relative, and it can be readily seen that the decreasing beam has the maximum deflection while the beam with both slopes being zero has the minimum deflection. The maximum moment is the same for all the free beams, while the beam with zero slopes has a moment that is one half of the free end beams.

Figure 6:
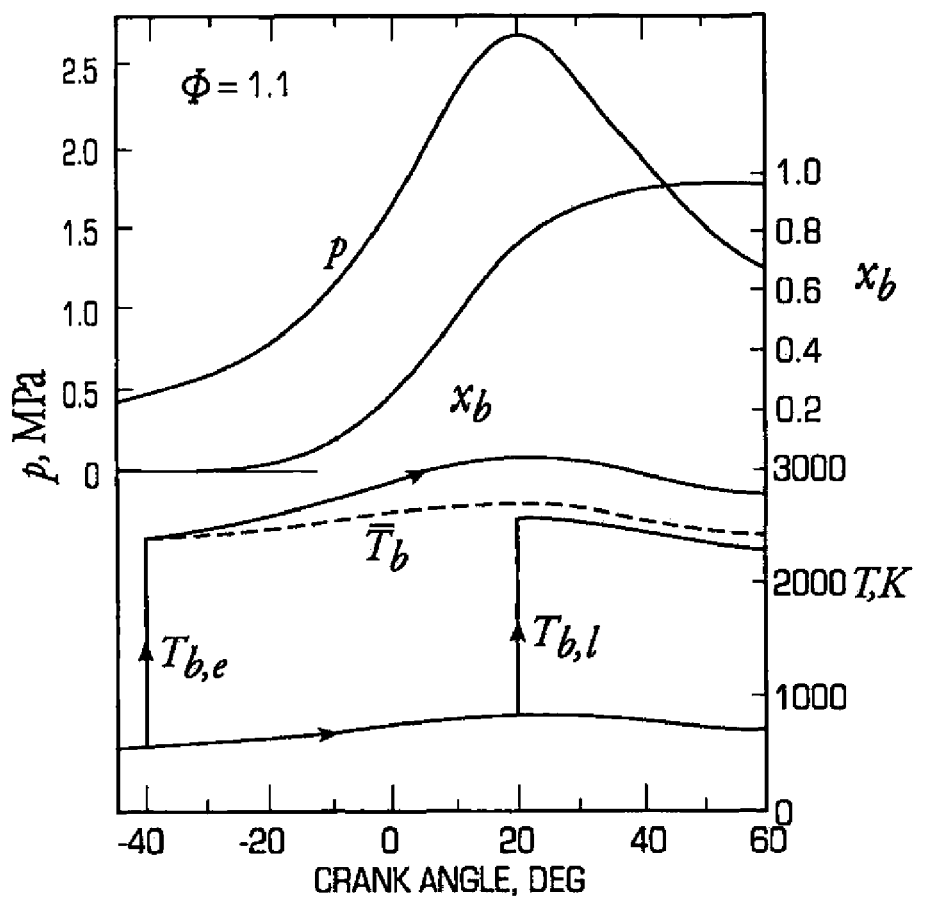
FIG. 6 is a plot showing typical pressure and burn rate for an internal combustion engine.
Figure 7:
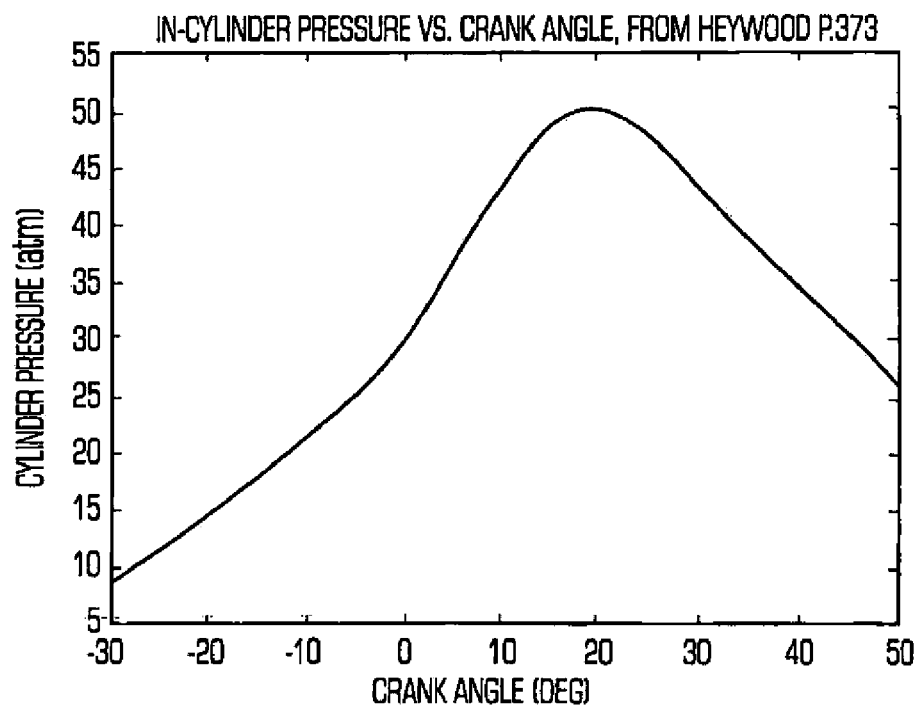
FIG. 7 is a plot of a digitized pressure curve.
Figure 8:
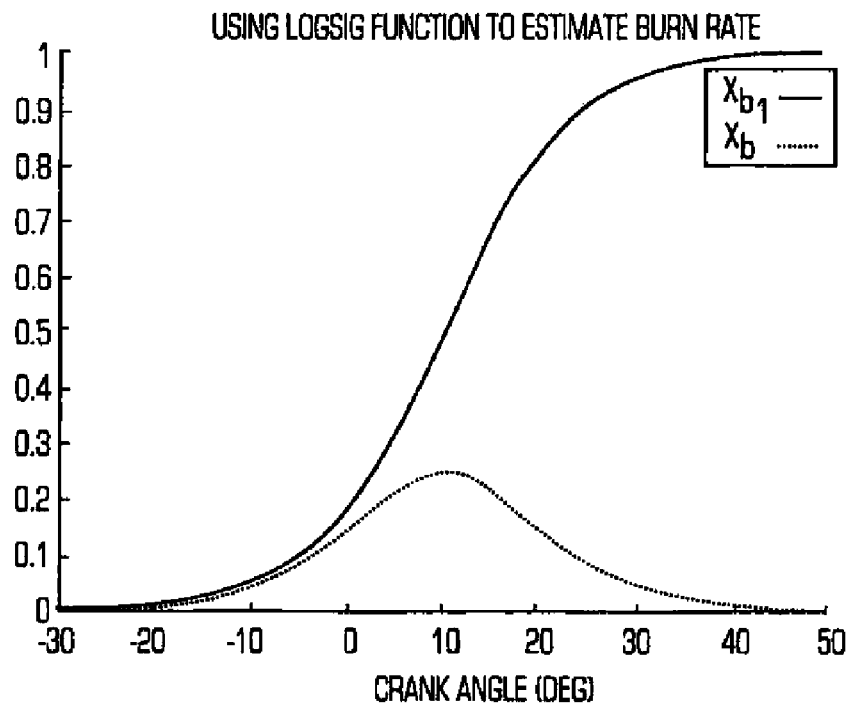
FIG. 8 is a plot of digitized burn rate and burn amount.

To determine and/or control the performance of an internal combustion engine, correlations between cylinder pressure variation and fuel burned are developed. These correlations may be useful for determining sensor deflection and eventually the actual pressures in the engine cylinder. FIG. 6 shows typical results of pressure and fuel consumption for an internal combustion engine. FIG. 7 shows the curve fit for pressure that reproduce the engine data, and FIG. 8 shows the fuel consumption rate. The pressure curve can be distributed over an arbitrary angle about top dead center, and it has a variable maximum pressure. The curve fit may be accomplished with the use of splines.

After the modeling is complete, the mask type is determined. For designing the sensing device 10, the modeling data may be used to fix key geometric features of the mask set design. Also, micro-machining design rules as appropriate to MEMS and SNF are accounted for. A high-definition print may be used as the masking technique. Alternatively, a chrome mask of the same type used in CMOS fabrication may be used. The exact masking technique to be used may be chosen based on resolution requirements, among other factors. For example, if feature sizes of less than 50 μm are required on the device, then the chrome mask may be preferable.

Figure 9:
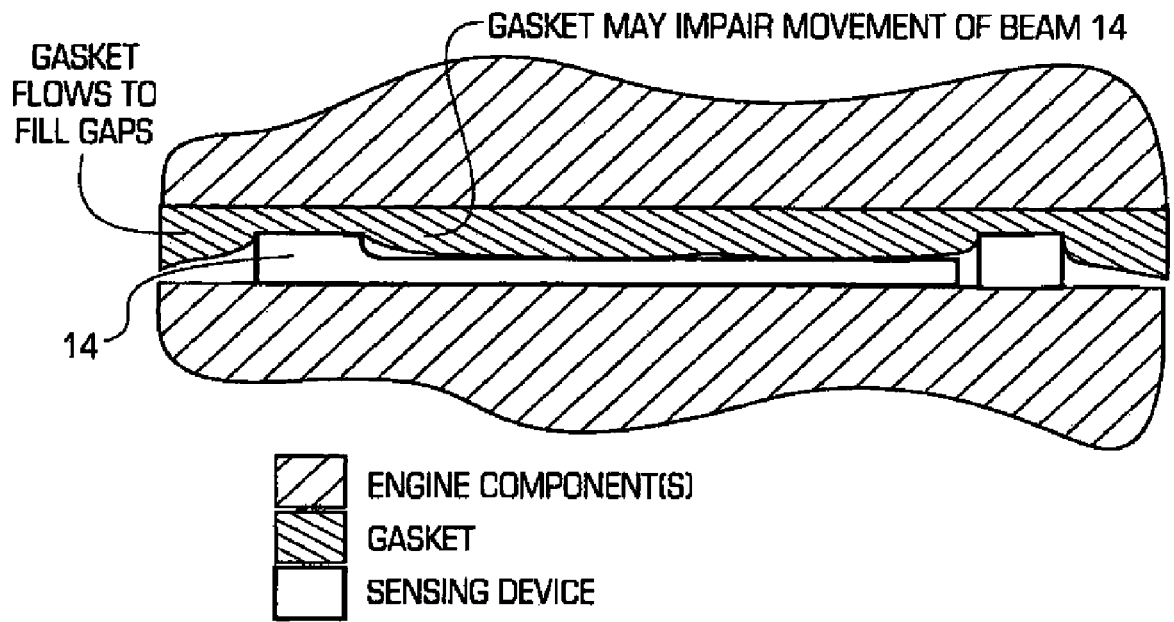
FIG. 9 is a schematic of the sensing device fitted between the gasket.

The beam 14 may become fouled with use, adversely affecting the accuracy of the measurement of deflections and pressure. FIG. 9 illustrates a potential problem with fouling. As the gasket is clamped down, the metal part of the gasket will flow into any orifice to ensure that the cylinder is correctly sealed. Thus, flow occurs into the cavity 12, changing the overall geometry of the sensing device 10.

To reduce this problem, the thickness of the beam 14 may be etched/machined down in the early stages of fabrication as shown in FIG. 9. However, the effectiveness of this etch/machining depends on the length to thickness ratio of the beam 14. The size of the gas flow passage 16 between the beam 14 and the sidewall of the sensing device 10 greatly affects the sensitivity of the sensing device 10. Making the gas flow passage 16 too small will result in quick fouling, while making it too large will reduce sensitivity of measurement. For a more accurate result, an array of devices may be placed next to one another so that the readings from the devices may be extrapolated to obtain a correct reading.

The basic structure of the sensing device 10 may be split into two main categories: fixed-free beam and fixed-fixed beam. Table 1 shows the beam depths for each structural category of beams.

TABLE 1

Device beam depths (all 100 μm thick)

| Device | Fixed-Free (Cantilever) | Fixed-Fixed (Cantilever) |
|---|---|---|
| Thinnest Section | 400 μm | 100 μm |
| Intermediate Sections | 600 μm | 200 μm |
|  | 900 μm | 500 μm |
| Thickest Section | 2100 μm | 1000 μm |

Figure 10:
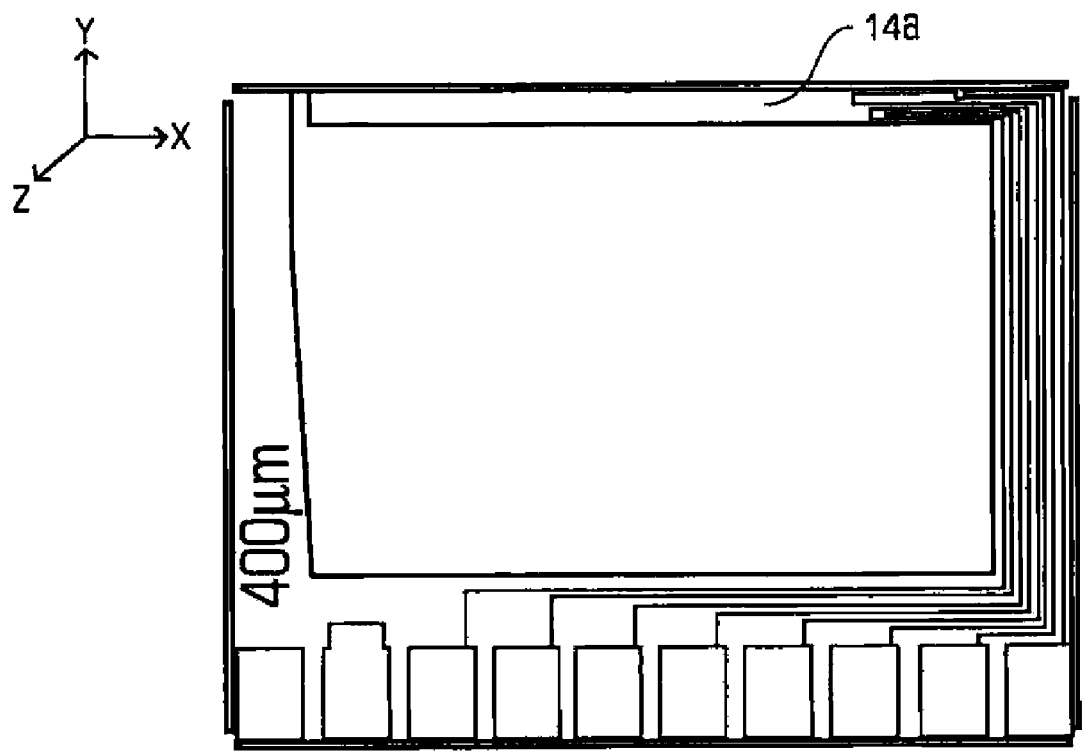
FIG. 10 is a sensing device having a fixed-free beam.

The fixed-free device may be a simple cantilever whose depth is altered four times. FIG. 10 shows a structure where the beam 14 is a cantilever 14a. In normal operation, the beam 14 would move in the y-direction. The thickness of the finished device, measured in the z-direction into the page, is 100 μm. As the depth of the cantilever 14a (measured in the y-direction) is 400 μm in this embodiment, the cantilever aspect ratio is 4:1. If this is on the limit of allowable stress, that means the silicon at the base of the beam 14 will be at its UTS during normal engine operation.

To optimize the signal and hence device performance, the piezo-resistive sensing elements 22 that are used to monitor the strain are placed near the outer fiber of the beam 14. Optimization of the system is achieved by placing four piezo-resistive sensing elements 22 on the cantilever 14a (beam 14). With two sensing elements 22 being on the upper cantilever surface and two sensing elements 22 on the bottom ("upper" and "bottom" referring to FIG. 10 and FIG. 11), each pair will be experiencing either compression or tension according to which direction the beam 14 is bent. Having four piezo-resistive sensing elements 22 facilitates measurement as a bridge may be set up with each pair of sensing elements 22 placed opposite one another. The pairs may be wired up directly on the mask; however, this may not be done for the first run because it is desirable to obtain an initial measurement of each resistor value independently during firing, due to the thermal gradient that is expected to form across the beam.

Figure 11:
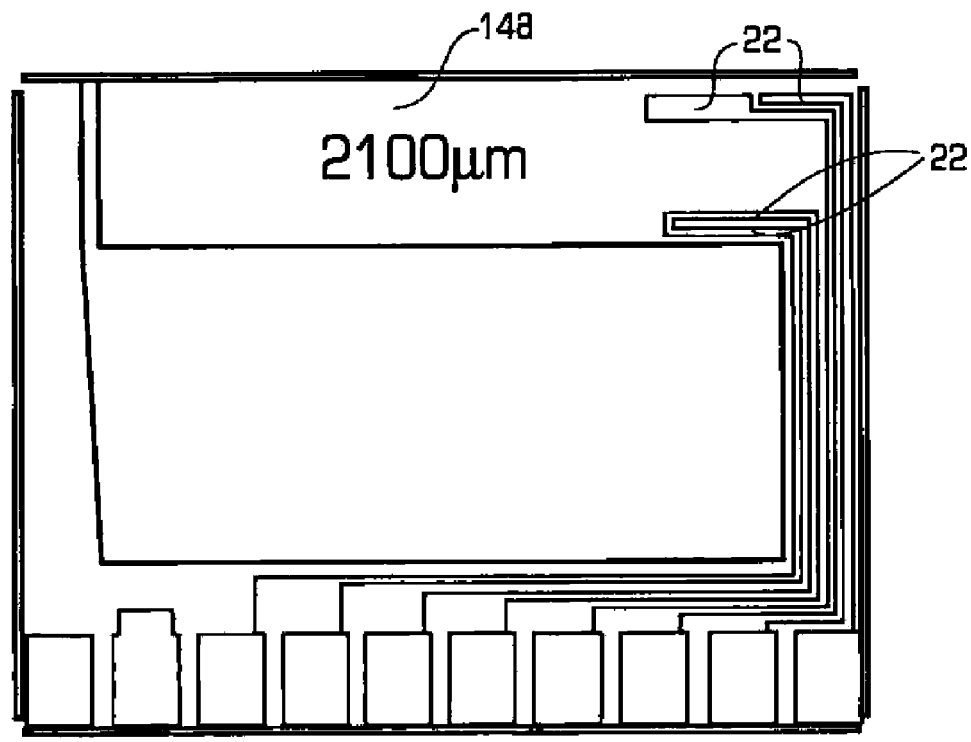
FIG. 11 is a sensing device having a fixed-fixed beam.

FIG. 11 depicts a cantilever 14a that is at the other extreme to the cantilever on the UTS limit that is shown in FIG. 10. The cantilever 14a of FIG. 11 is, simplistically put, a beam that is "certain" not to fail. The cantilever 14a in FIG. 11 is 2100 μm deep (in the y-direction) and has an aspect ratio of 21:1. Thermal errors would occur when firing with this device, as the temperature could be different between the two sets of piezo-resistive sensing elements 22 (compression and tension). The measures described above for temperature compensation may be adopted to minimize thermal error.

Figure 12:
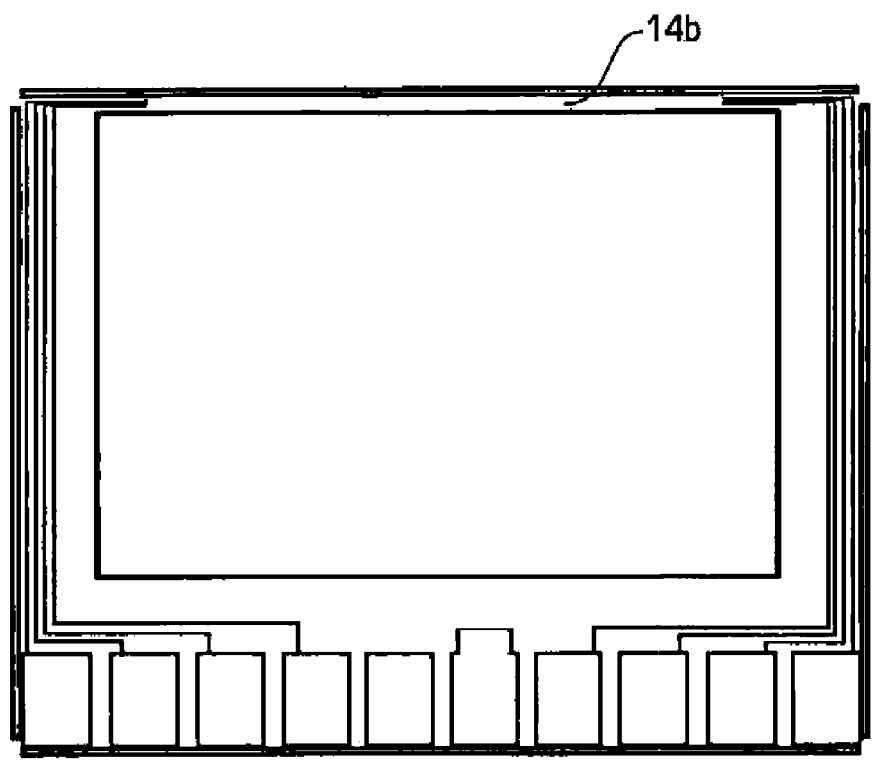
FIGS. 12 and 13 are a fixed-fixed beam having a width of 100 μm and 1000 μm, respectively.
Figure 13:
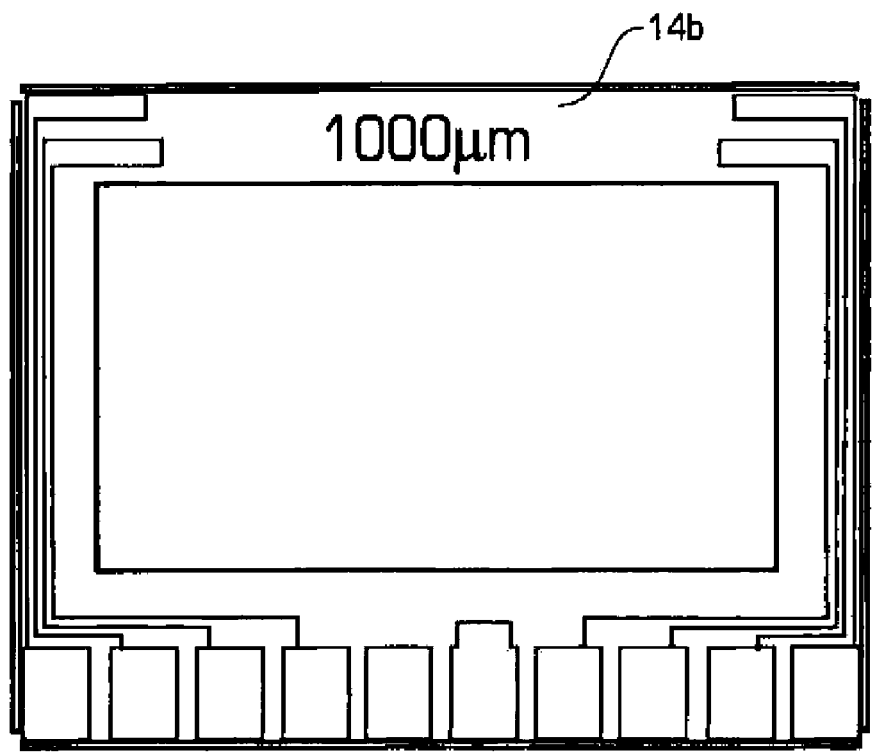

The beam 14 may be a fixed-fixed beam structure instead of a fixed-free structure like a cantilever. The fixed-fixed beam structure may also have four different beam thicknesses, as shown in Table 1. The values are, however, different as the strength of these designs is four times that of the fixed-free designs. FIG. 12 depicts a fixed-fixed beam 14b having a depth of 100 μm, and FIG. 13 depicts a fixed-fixed beam 14b having a depth of 1000 μm.

One of the difference between fixed-free and fixed-fixed beams is the position of the piezo-resistive sensing elements 22. In both cases, the pizeo-resistive sensing elements 22 are placed as close to the high-stress areas of the beam 14 as processing will allow. In the case of the fixed-fixed beams, this configuration is easy to make as connection tracks can be run down along both sides of the die. It is preferable not to place the piezo-resistive sensing elements 22 on the outer fiber of the device, as the sensing elements 22 are photosensitive and doing so could give inaccurate reading during firing.

Device Fabrication

The sensing device 10 may be fabricated by using a process that is a variation on the well-known process for producing ultra-thin strain gauges. Like the engine pressure sensor, these strain gauges are made from a semiconductor material, preferably a single-crystal silicon, that is doped in strained regions to produce piezo resistors. The fabrication process may use six masks, although this is not a limitation of the invention. Preferably, the sensing device 10 is etched out of a pure silicon wafer.

The sensing device 10 may be fabricated using either SOI or plain (B') wafers. SOI wafers have a buried layer of silicon dioxide. The SOI wafers have been fabricated with device layer thickness: some having a device layer of approximately 100 μm and others having a device layer of approximately 20 μm. "Device layer thickness" refers to the amount of silicon on the buried oxide. The plain wafers are single crystal silicon with no oxide layer. The purpose of the oxide is to act as an etch stop for the bulk micromachining. As such, the plain wafers have to have a timed etch to define the mechanical structures. This in itself is not technically difficult but the oxide also acts as an etch stop when the handle silicon is removed. A combination of wafer grinding, polishing, and back DRIE etching give a high degree of control on the process that allows the device to be released from the plain wafer.

Figure 14:
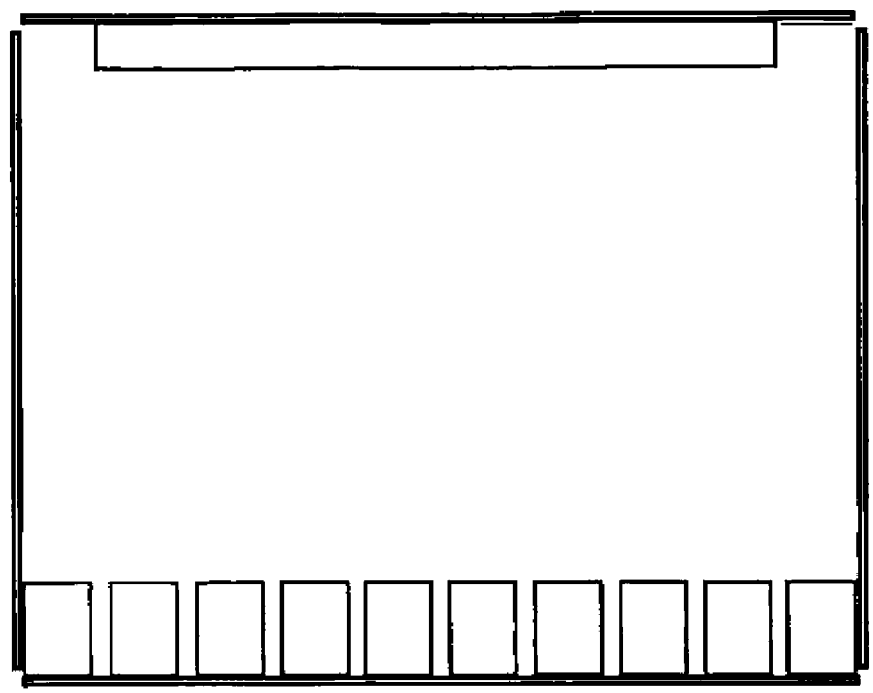
FIGS. 14 through 20 are masks that may be used for fabrication of a sensing device with a fixed-free beam.

FIG. 14 shows a first mask 50 of the set of masks used to fabricate the sensing device 10. The first mask 50 depicted in FIG. 14 is a shallow KOH mask. The KOH mask is useful for producing a relatively shallow etch on the surface of a device. The shallow etch produces small pits for the flex interface to fit into, ensuring alignment and decreasing the package thickness. The shallow etch also removes material from the thickness of the beam 14. Using the first mask 50, the etch time is about five minutes at about 80° C. As KOH attacks the photoresist, a silicon dioxide layer of about 500 nm in thickness is grown on the wafer before patterning. The first mask 50 is then put down and the wafer is etched in HF to remove the oxide. During the KOH etch, it is the remaining oxide that actually masks the wafer. After the KOH etch, the remaining oxide is removed and the wafer is decontaminated from potassium prior to the CMOS processing.

Figure 15:
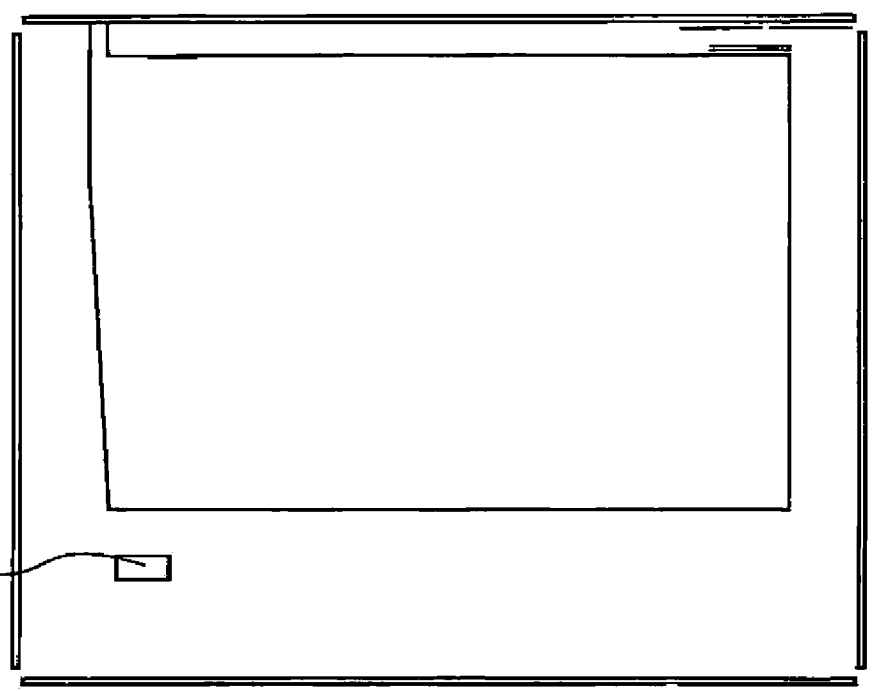

FIG. 15 shows a second mask 52 of the set of masks used to fabricate the sensing device 10. The second mask 52 defines the piezo-resistive sensing elements 22. As with the KOH mask, an oxide is initially deposited and etched using HF. The oxide masks the device during implantation. Unlike the KOH mask, this oxide is not removed after the implantation. During patterning, the oxide is removed from those parts of the mask that will be bulk micromachined in the final etching stage (FIG. 19) using DRIE. Hence, the oxide layer is etched from the area around the beam 14.

Figure 16:
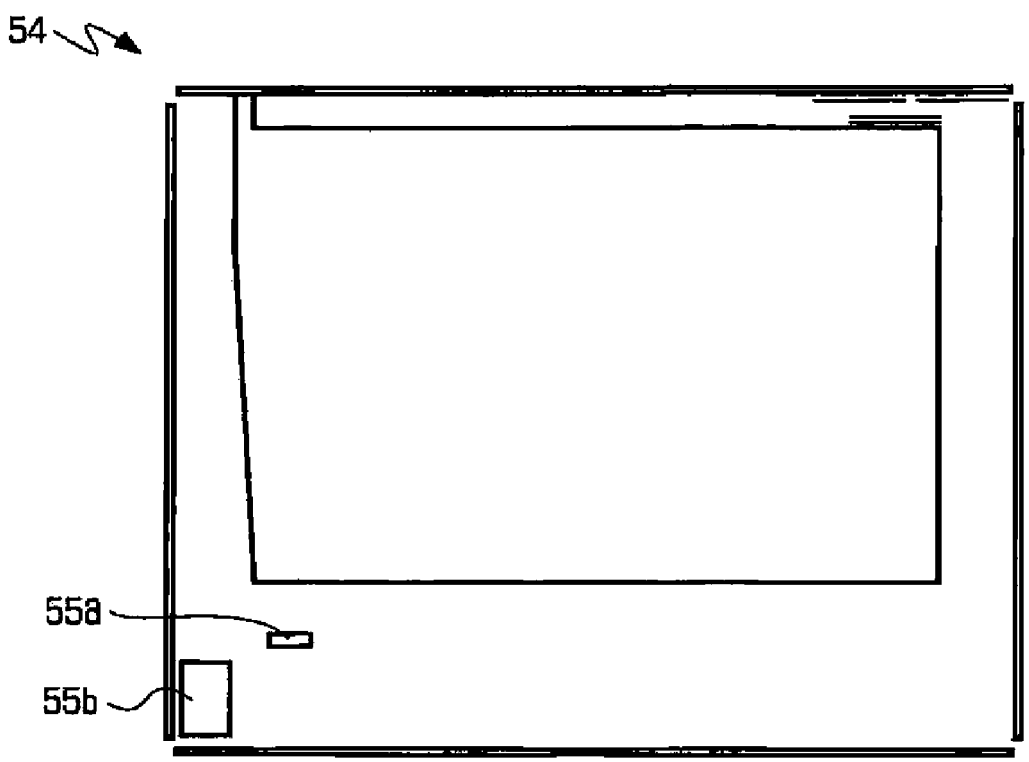

FIG. 16 shows a third mask 54 for the contact etching. This mask represents the highest resolution required in the device processing. Contact etching and contacting to the implants is inherently a complex procedure. Thus, if the high resolution is about 2 μm, the window may be opened up to a 10-μm range. In addition to giving a much larger contacting area, the mask allows for additional doping of the contact point of the resistor if it is deemed necessary. The third mask 54 is exposed after the wafers have been deposited with 2-μm oxide. The oxide is then etched using HF.

The bottom left corner of FIG. 16 shows that two windows 55a, 55b are open to the silicon. In FIG. 15, only the smaller of the two windows (shown as window 53) is doped. The windows give two terminals in the finished device: one enabling direct contact to the silicon (e.g., the larger pad) and the second one offering an effective p-n diode. These terminals can be used to check the electrical properties of each individual device. The direct silicon contact can also be used to bias the base silicon in relation to the piezo resistor implants, providing an effective p-n junction between resistors. Such a system is less likely to leak current and experience cross talk during measurements.

Figure 17:
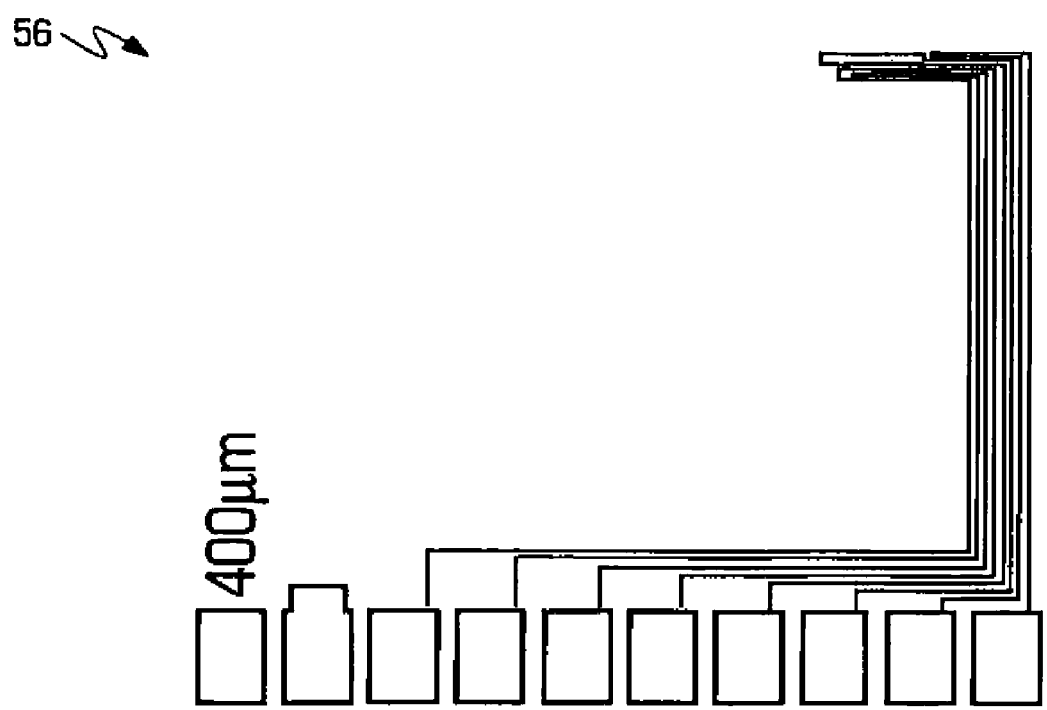

FIG. 17 shows an aluminum mask 56 for the 400 μm fixed-free sensing device (see FIG. 10). There may be a "border," i.e. the aluminum layer, around the sensing device 10 in all masks (FIGS. 14-20). The border is eventually removed of material so that the device can be "punched out" of the wafer and released. Instead of using the border, the device may be released from the wafer by sawing with a diamond blade. However, due to the thinness and fragility of the MEMS devices, sawing may not always produce the desired result.

After the piezo-resistive sensing elements 22 are implanted into the silicon and the contacts are opened through the protective silicon dioxide layer, metal tracks are run to the resistors. The metal tracks usually contain aluminum, although other metals may be used e if desired. It may be desirable to make aluminum tracks thicker than they would expected to be for devices of similar scale and geometry because the sensing device 10 will be operating in a harsh environment inside the cylinder. In all other aspects of the design, the aluminum mask is a standard.

Figure 18:
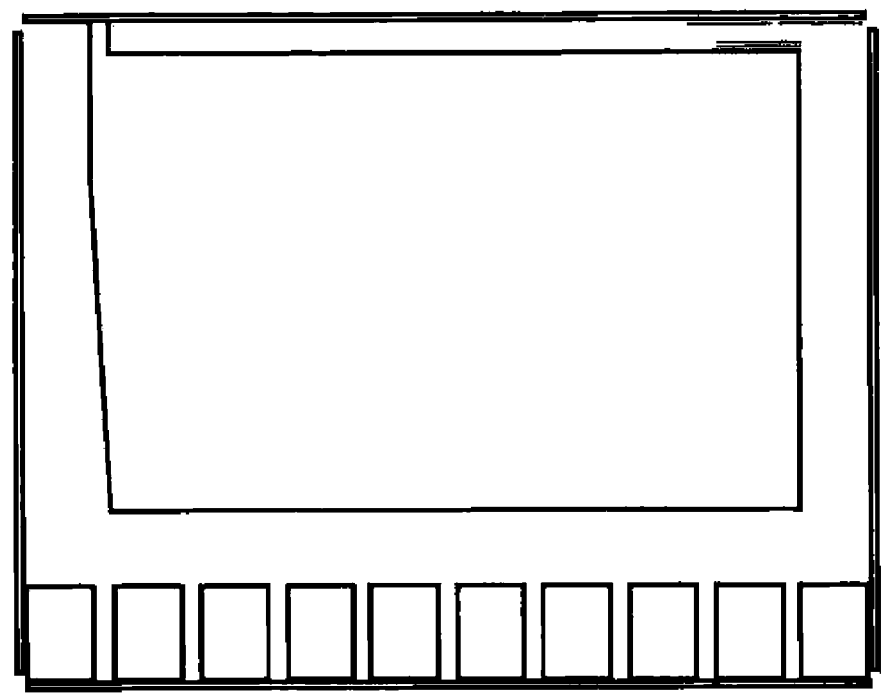

FIG. 18 shows a fourth mask 58 for forming the Low Temperature Oxidation (LTO) contact pads. After aluminum patterning, the devices are deposited with a protective LTO layer to protect the aluminum from the harsh environment. The LTO is patterned to open up the contact window to the aluminum. In the exemplary embodiment, the fourth mask also defines the cantilever structure as the oxide is removed prior to the DRIE etch.

Figure 19:
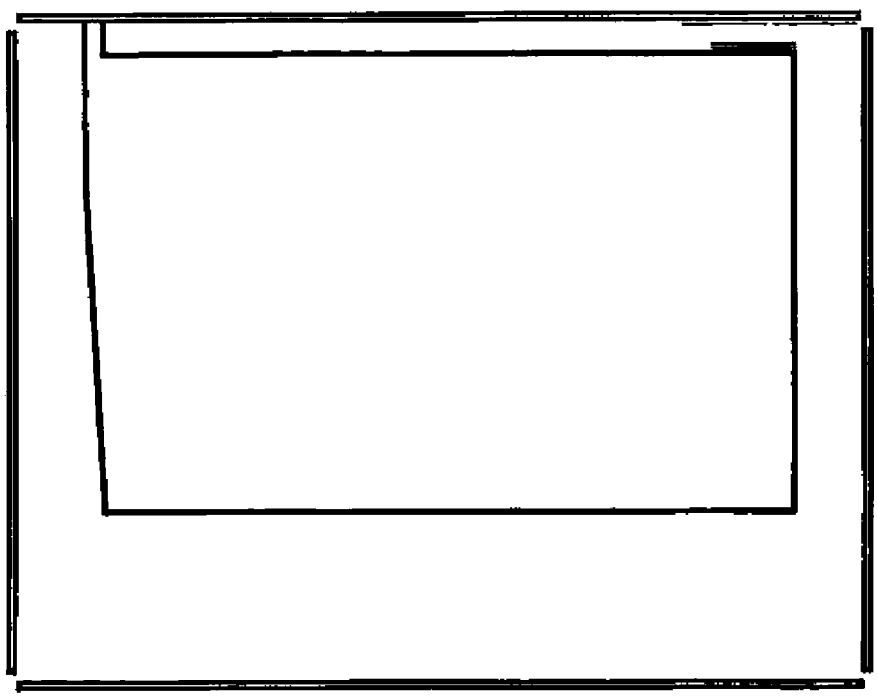

FIG. 19 shows a fifth mask 60 for bulk removal of silicon to define the physical structure of the sensors. The DRIE is the final photolithography stage. Non-standard 10-μm thick photoresist is used. Although the 10-μm photoresist does not retain the same definition properties of thinner resists, it is likely to be able to withstand the harsh plasma used during DRIE.

Figure 20:
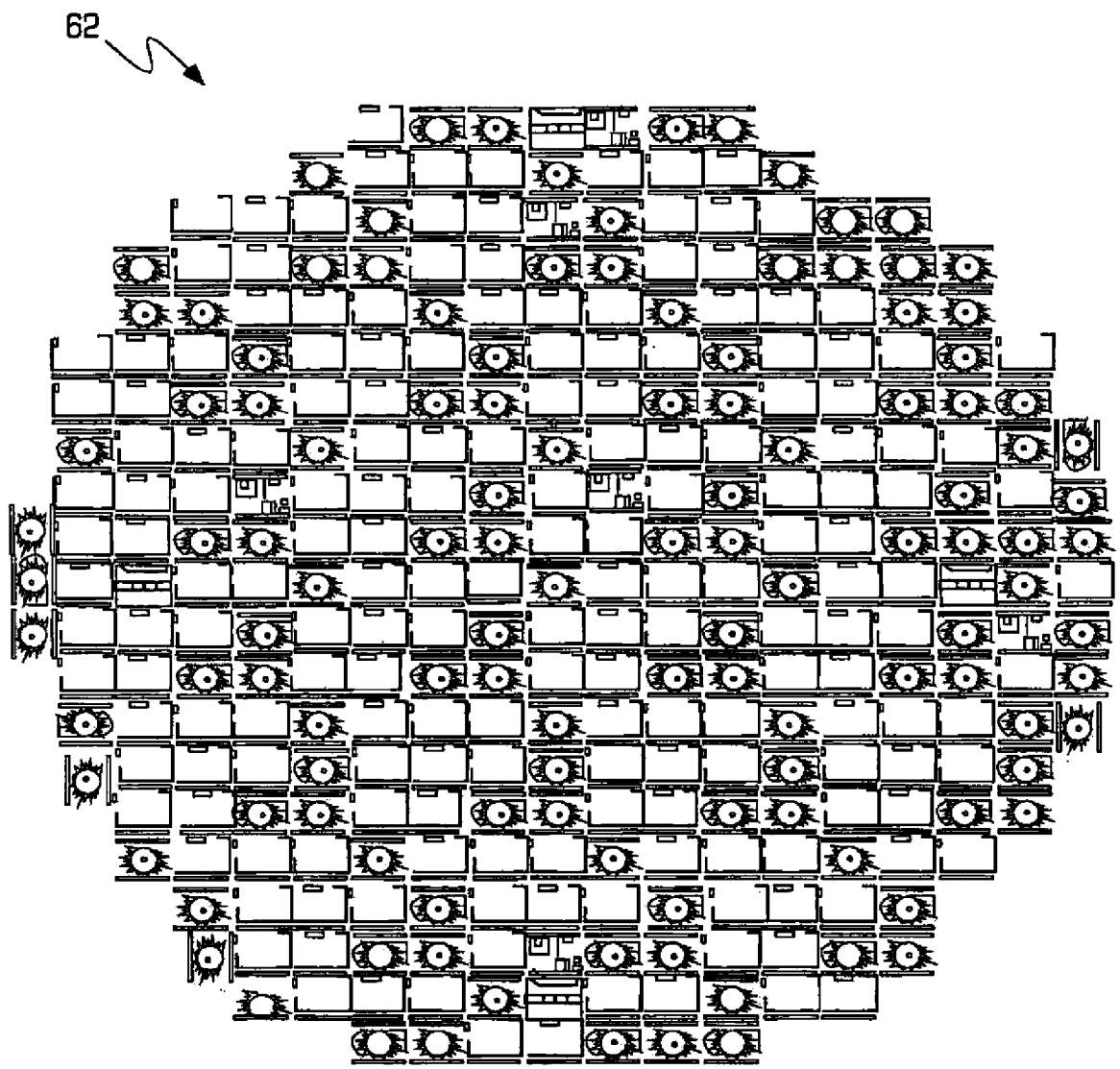

FIG. 20 shows the layout of a sixth mask 62. As shown, the layout is modular and allows a "common" interface tape method to be used to join the engine sensor to its packaging. Hence, all devices on this mask set can fit onto standard 3M-microflex tapes. In addition, the mask set may include numerous devices. Thus, paddles, strain gauges, and pressure sensors may be fabricated all on the same mask.

Figure 21:
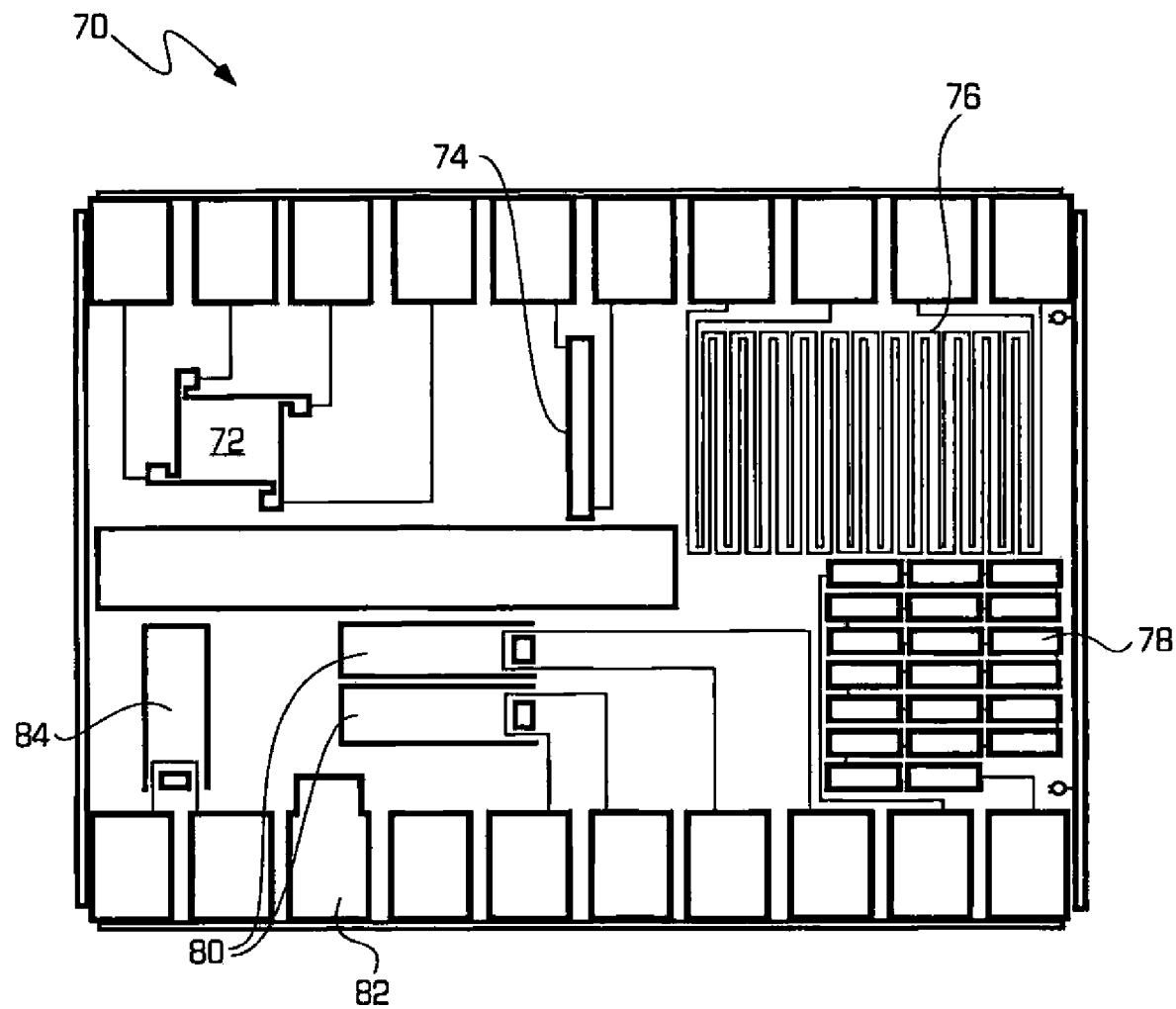
FIG. 21 is an optional test cell that may be fabricated with the sensing device on the same mask set.

FIG. 21 shows an optional test cell 70 that may be fabricated with the sensing device on the same mask set. Working clockwise from the top right in FIG. 21, there are:

a four-point probe tester 72 used to gauge the implant/piezo resistor and its conductivity;

a plain resistor 74 with much larger geometry than that of the engine sensors' resistors;

a set of intertwined resistors 76 to check for leakage a set of 20 resistors 78 wired up in series, used to examine contact resistance;

a pair of cantilevers 80 that can be bent in the plane normal to the mask, used to measure the gauge factor of the piezo resistors;

a direct and diode connection 82 to the device layer silicon, exactly as used in the actual device; and a single cantilever 84 set tangentially, used to check that the orientation on the crystal is correct (e.g., by comparing results with the gauge factor measured above)

The devices thus described are preferably processed from Silicon On Insulator (SOI) wafers. Properties of SOI wafers are summarized in Table 2. The devices operate through the bending of the beam 14 that has to be shallow-etched so that it does not foul on the gasket or cylinder head during bending. The beam is defined through Deep Reactive Ion Etching (DRIE). The fabrication involves doping the piezo resistors into the silicon, patterning out the aluminum contacts and dry etching out the device silicon to the oxide buffer layer. The handle can then be removed by a combination of grinding, polishing, and DRIE.

TABLE 2

Properties of wafers

| Number and type of wafers | Wafer diameter | Device layer thickness | Oxide thickness | Handle thickness |
|---|---|---|---|---|
| 12 SOI | 100 mm | 20 μm | 2 μm | 350 μm |
| 12 Standard (b'prime) | 100 mm | N/A | N/A | 550 μm |

The sensor may be fabricated using the process explained in U.S. patent application Ser. No. 11/048,462 filed on Jan. 31, 2005, which is hereby incorporated by reference in its entirety for all purposes. The process described in the pending application uses SOI wafers to produce finished three-dimensional structures (MEMS devices) that are 100 μm thick.

Figure 22:
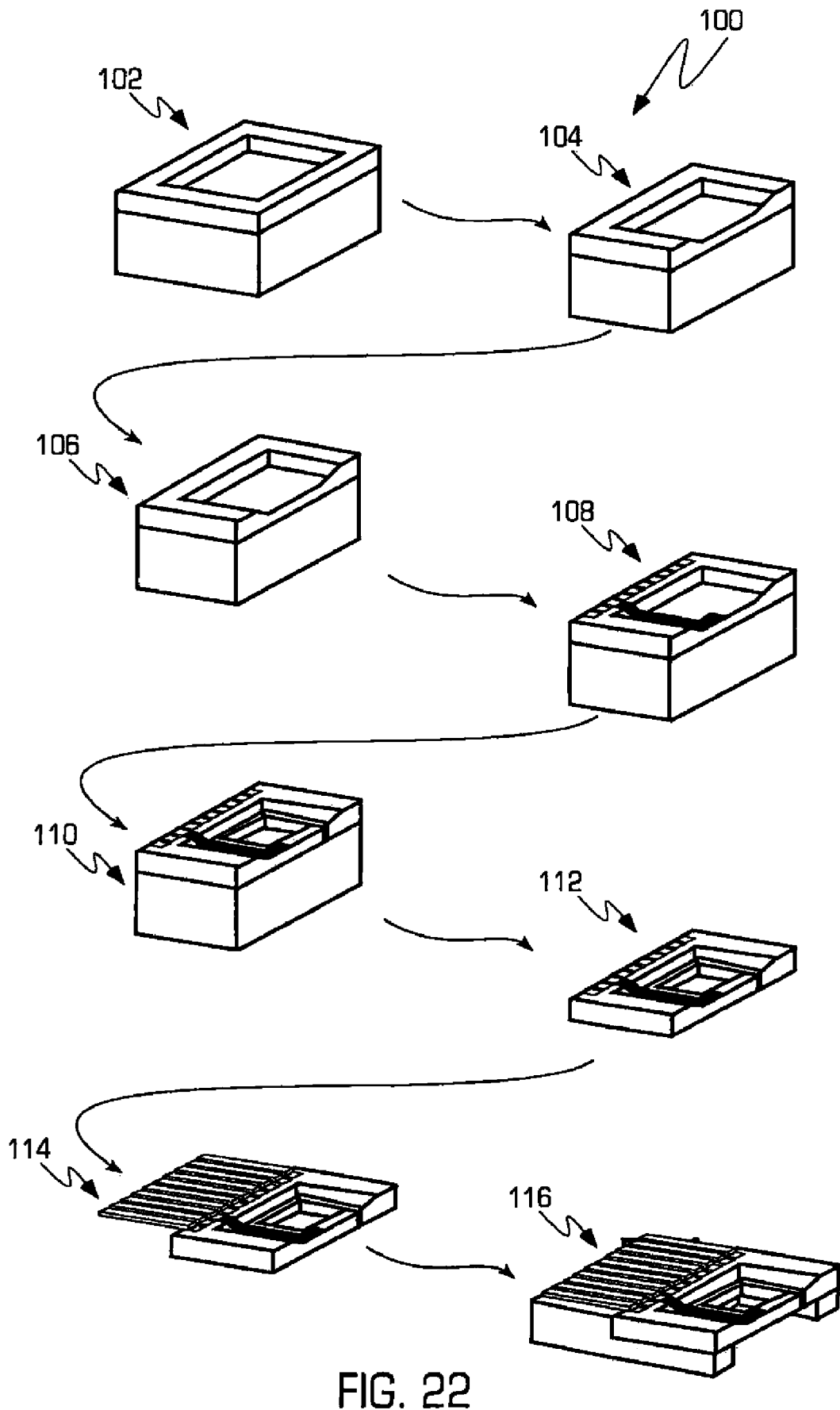
FIG. 22 is a schematic depiction of sensing device fabrication process.

FIG. 22 depicts the process schematically, as process 100. There are numerous steps to the process and as can be seen in the right-most columns of FIG. 22, the process is adaptable. This allows process variation at set points in the design of a device. The process starts involves:

providing a semiconductor substrate and forming a cavity (step 102).
  a shallow KOH etch for interface (step 104). A surface micro machining wet etch that forms shallow pits into which the device interface can be aligned.
  piezo resistor implant that forms the piezo-resistive sensing elements 22 (step 106). Generally, this operation is performed off-site.
  contact oxide-etch. After implant, an oxide layer is deposited to insulate the piezo-resistors. This layer has to be dry-etched in plasma so that electrical contact can be made to the resistors.
  aluminum (sputter, mask & pattern) (step 108). This aluminum makes contact to the resistors through the contact windows and is patterned to form tracks to contact pads. In most processes, these pads are for wire bonding. However, in the case of in-cylinder sensor, this device will interface directly with flex-type tape.
  DRIE (step 110) defines the actual mechanical structure. It uses a technique known as the "Bosch process," which allows silicon to be etched with high aspect ratios (up to 100:1). The process being anisotropic, it allows the structure to be etched normal to the wafer surface.
  Back Grind and DRIE (step 112). Once the structure has been defined, it requires releasing from the background layer of silicon (known as the handle). This is achieved by back-grinding the wafer. Essentially identical to the macro grinding process, it allows for bulk removal of silicon. The back-grind falls short of the oxide interface with the device and is completed with a much slower but more controlled plasma etch.
  the devices are released from the handle and attached to electrical interface for the flex material (step 114). This release process involves dropping the wafer into acetone and sieving the devices out.
  connecting to the flex tape (step 116). Electrical connections are made to the obtained flex tape.

Device Packaging and Mounting

Figure 23:
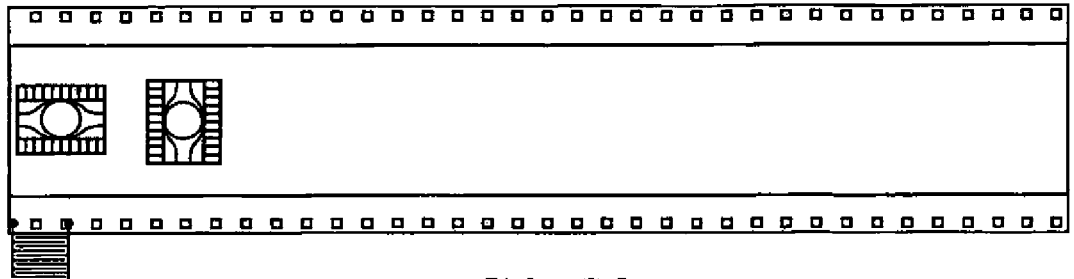
FIG. 23 is an exemplary flex material that may be used to interface the sensing device.

FIG. 23 shows a flex tape used to interface the sensing device 10. The flex tape allows the sensing device 10 to communicate with outside devices. Typically, cylinder head gaskets are between 1.0 mm and 1.2 mm. Therefore, it is desirable for a MEMS device that will be placed in the cylinder to have a thickness of less than 50 μm to avoid adverse effects on the gasket performance. A 25-μm thick Kapton® tape that is patterned with 15 μm of copper (and maybe 2 μm of gold capping) interconnects.

The pressure/temperature sensor can be designed to mate to the flex that is already in use, to form a flexi-mounted device. The flexi-mounted device will then be mounted into the cylinder head of a small glow plug engine (of the sorts used for model airplanes).

Figure 24:
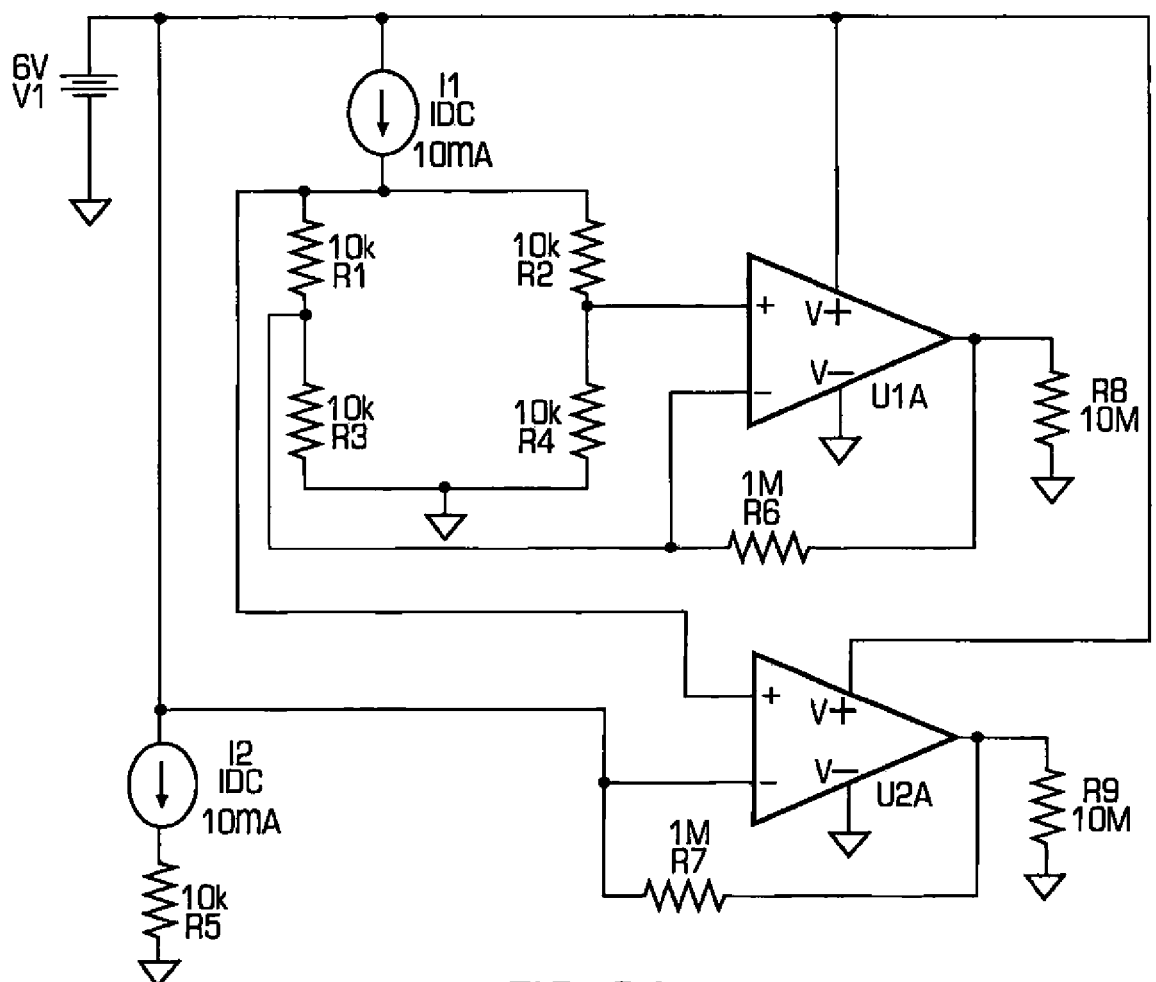
FIG. 24 is a bridge circuit that may be used to measure beam deflection.

Interface between the sensing device 10 and other devices (not shown) utilize some electronics to give a voltage output that is proportional to beam deflection. This voltage output is not exactly the same as a direct pressure output. To obtain these outputs, an integrator and differentiator may be incorporated, as these values are a function of time. FIG. 24 shows a bridge circuit that may be used to measure beam deflection. More specifically, the bridge circuit is useful for amplifying the signal from the bridged piezo resistors. In addition to the base measurement, torsion strains put upon the beam during firing may be examined. The examination may include examining the ratio of the total of the resistance fluctuation from strain.

The flex material or the flex tape on which the sensing device 10 is mounted is flexible and shows excellent heat tolerance. The flex material may be custom-ordered from companies such as 3M, or implemented with a commercially available part. Table 3 shows material properties of flex components, which are commercially available. An external device communicates with the sensing device 10 while the sensing device 10 is in the cylinder head gasket. 3M has been contracted to provide microflex tape for this application. Ordinarily, in a high-temperature application, this type of tape (made from Kapton) would not be suitable. The flex pattern is similar to that shown in FIG. 25. In the exemplary flex pattern shown in FIG. 27, two planar strain gauges and a Linear Polarization Resistance (LPR) corrosion sensor are fitted to the flex. A 40-pin Zero Insertion Force (ZIF) connector is used to interface the flex to a PCB. The overall length of the flex is 17 cm (4.28 inches).

TABLE 3

Flex component material properties

| Material | Properties |
|---|---|
| Polyimide substrate (DuPont Kapton Type E) | Mechanical properties: Modulus 800 KPSI CTE = 17 ppm/° C. CHE = 9 ppm/% RH Shrinkage = 0.03% (200° C.) |
| Copper circuitry | Metallurgical properties: |

TABLE 3-continued

Flex component material properties

| Material | Properties |
|---|---|
| | Electrodeposited (high ductility) |
| | 99.9% purity IPC-TM-659 method 2.3.15 |
| | Tensile Strength 40-60 Kpsi ASTM E-345-86 |
| | Elongation 5% min. ASTM E-345-86 |
| | Coefficient of Expansion $1.7 \times 10^{-5}$ $20°$ C. < T < $100°$ |
| | Hardness 120HK +/− 20 ASTM-578-87 |
| Gold & Nickel plating on the copper circuitry | Typical Nickel thickness 0.4-1.25 um as tested by x-Ray Fluorescence |
| | Typical Gold thickness 0.2-3.2 um 99.9% pure gold |
| Epoxy protective layer (Asahi Chemical Research Laboratory Super Resist CCR-232 GF No. 6) | Note: There are Polymide adhesiveless based protective layers other than Epoxy on the market. These materials handle higher than epoxy operating temperatures. These "covercoats" are not in product currently at 3 M but could be applied to sensor in lab setting for evaluation. (See vendors listed below) |

The electrical interface of the microflex uses an adhesive loaded with nickel particles. The adhesive comes in tape form and is epoxy-based. The electrical interface is thus not suitable for applications above $120°$ C. However, as the sensing device 10 is to fit in the head gasket and will be under pressure during elevated temperature (above $120°$ C.), any plastic flow of the adhesive will lead to improvement of the electrical interface.

Device Operation

Table 4 lists some operational criteria for a cylinder head sensor.

TABLE 4

Operating Criteria for an in-cylinder pressure sensor

| Pressure range | Over pressure | Continuous sensor temperature range | Frequency Response | Temperature Sensitivity | SNR | Lifetime |
|---|---|---|---|---|---|---|
| 0 to 30 kpsi | x2 of pressure range | $-40°$ C. to $350°$ C. | 0.01 Hz to 30 kHz | ±0.03% | 2000:1 @ 15 kHz | $0.5 \times 10^9$ cycles |

Considering a MEMS sensor fabricated from a single-crystal silicon, the sensing device 10 is able to meet most, if not all, of the criteria listed in Table 4. Referring to Table 4, the pressure range values are relevant to a cavity flow device where reed ductility determines the measurable pressure range and sensitivity of measurement. Generally, greater the measurable pressure range, the less sensitive the measurements will be.

The limiting operational temperature range of the sensing device 10 is that at which the thin film aluminum that forms the interconnects from the piezo resistor sensing elements 22 to the bond pads 18 begins to degrade. This degradation typically happens in the $600°$ C. range and hence the device will be more than capable of handling the temperatures founding a typical Otto cycle engine. A flex for connecting the device to the electronics that can withstand the hottest temperature inside a cylinder is manufactured by 3M. This flex material may contain, for example, DuPont's E-Film that has a long-term stability of $300°$ C. and a short-term stability of about $400°$ C.

Frequency response can be easily adapted to suit the 30 kHz criteria. Presently, MEMS cantilever devices with resonance frequencies in the MHz range are available and such construction poses no technical challenges.

Temperature sensitivity in the $10^{-3}$ degree range requires the incorporation of a p-n diode at the combustion face.

The Signal-to-Noise Ratio (SNR) may be challenging for petrol engines due to the RF noise produced by the ignition system. Other than this external noise source, the system electronics may be designed such that white noise from the piezo resistors is filtered out.

The beam 14 is virtually solid state. As such, the lifetime reliability of the system is well in excess of that of the gasket and even the engine.

Using the sensing device 10 of the invention, failure in valves, piston rings, or the cylinder head gasket can be identified. The sensing device 10 fits in the cylinder head adjacent to the gasket with the sensing elements 22 exposed to the combustion process in the cylinder. The sensing device 10 may be incorporated into existing engines or built into new engines. By using MEMS technology for device fabrication, one can keep the unit cost of each sensing device 10 (and thus the unit cost of the resulting sensor) low.

Although the invention has been described with reference to the above example, it will be understood that modifications and variations are encompassed within the spirit and scope of the invention. Accordingly, the invention is limited only by the following claims.

What is claimed is:

1. A sensing device comprising:
a planar substrate characterized by a plane;
a beam formed on the substrate, the beam being capable of deflecting in the plane of the substrate into a cavity of the substrate in response to different pressures applied to the beam, wherein the beam deflects according to a difference between a first pressure on a first side of the beam inside the cavity and second pressure on a second side of the beam outside the cavity in a space outside the sensing device; and a piezo-resistive sensing element coupled to the beam, wherein the piezo-resistive sensing element detects beam deflection responsive to a gas flow outside the cavity adjacent the second side and generates an electrical signal as a function of beam deflection;

wherein the sensing device has a thickness of less than about 100 µm.

2. The sensing device of claim 1 further comprising a cavity formed in the substrate, wherein the beam deflects according to difference between pressure inside the cavity and pressure outside the cavity.

3. The device of claim 1, wherein the substrate is a silicon substrate and the piezo-resistive sensing elements are doped into the silicon substrate.

4. The device of claim 1, wherein the piezo-resistive sensing elements form a first pair of piezo-electric sensing elements, further comprising a second pair of piezo-resistive sensing elements for detecting temperature.

5. The device of claim 4, wherein the two pairs of piezo-resistive sensing elements are formed on the same surface of the substrate.

6. The device of claim 1 further comprising:
bond pads on the substrate; and
aluminum connections between the piezo-resistive sensing elements and the bond pads.

7. The device of claim 1 further comprising a piezo resistor formed on the substrate for temperature measurement.

8. The device of claim 1 further comprising a p-n diode formed on the substrate for temperature measurement.

9. The device of claim 1, wherein the beam has a fixed end and a free end, the fixed end being coupled to the piezo-resistive sensing elements.

10. The device of claim 1, wherein the beam has two fixed ends.

11. The device of claim 1, wherein the beam has a uniform cross-section through its length.

12. A sensor comprising:
a flexible material having an electrical interface;
a sensing device mounted on the flexible material, the sensing device, the sensing device having a thickness of less than about 100 µm and including:
a planar substrate characterized by a plane;
a cavity formed in the substrate;
a beam formed on the substrate, the beam being capable of deflection in the plane of the substrate into the cavity in response to different pressures applied to the beam, wherein the beam deflects according to a difference between a first pressure on a first side of the beam inside the cavity and a second pressure on a second side of the beam outside the cavity in a space outside the sensing device;
one or more piezo-resistive sensing elements coupled to the beam, wherein the piezo-resistive sensing elements detect beam deflection responsive to a gas flow outside the cavity adjacent the second side and generate an electrical signal as a function of the beam deflection; and
one or more bond pads coupled to the piezo-resistive sensing elements.

13. A method of fabricating a sensing device, the method comprising:
providing a planar substrate characterized by a plane;
forming a beam on the substrate, the beam configured to deflect in the plane of the substrate into a cavity of the substrate responsive to pressure on different sides of the beam, wherein the beam deflects according to a difference between a first pressure on a first side of the beam inside the cavity and a second pressure on a second side of the beam outside the cavity in a space outside the sensing device; and
forming one or more piezo-resistive sensing elements coupled to the beam, wherein the piezo-resistive sensing elements detect beam deflection responsive to a gas flow outside the cavity adjacent the second side and generate an electrical signal as a function of beam deflection;
wherein the sensing device fabricated by the method has a thickness of less than about 100 µm.

14. The method of claim 13 further comprising etching the substrate to form a cavity so that the piezo-resistive sensing elements detect pressure difference between inside the cavity and outside the cavity.

15. The method of claim 13 further comprising doping a different portion of the substrate to form a temperature-sensing piezo-resistor.

16. The method of claim 13, wherein the piezo-resistive sensing elements are a first pair of piezo-resistive sensing elements, further comprising doping another portion of the substrate to form a second pair of piezo-resistive sensing elements for temperature measurement.

17. The method of claim 16 further comprising forming the two pairs of piezo-resistive sensing elements on the same surface of the substrate.

* * * * *